US012748934B2

(12) United States Patent
Nagata et al.

(10) Patent No.: US 12,748,934 B2
(45) Date of Patent: Sep. 29, 2026

(54) ESTIMATION APPARATUS, LEARNING APPARATUS, ESTIMATION METHOD, LEARNING METHOD, AND PROGRAM

(71) Applicants: NTT, Inc., Tokyo (JP); University of Tsukuba, Ibaraki (JP)

(72) Inventors: Masaaki Nagata, Tokyo (JP); Yizhen Wei, Ibaraki (JP); Takehito Utsuro, Ibaraki (JP)

(73) Assignees: NTT, Inc., Tokyo (JP); University of Tsukuba, Ibaraki (JP)

( * ) Notice: Subject to any disclaimer, the term of this patent is extended or adjusted under 35 U.S.C. 154(b) by 132 days.

(21) Appl. No.: 18/834,798

(22) PCT Filed: Feb. 3, 2022

(86) PCT No.: PCT/JP2022/004278
§ 371 (c)(1),
(2) Date: Jul. 31, 2024

(87) PCT Pub. No.: WO2023/148889
PCT Pub. Date: Aug. 10, 2023

(65) Prior Publication Data
US 2025/0124241 A1 Apr. 17, 2025

(51) Int. Cl.
*G06F 40/51* (2020.01)
*G06F 40/166* (2020.01)

(52) U.S. Cl.
CPC ............ *G06F 40/51* (2020.01); *G06F 40/166* (2020.01)

(58) Field of Classification Search
CPC ......... G06F 40/51; G06F 40/166; G06F 40/47
See application file for complete search history.

(56) References Cited

U.S. PATENT DOCUMENTS

| | | | | |
|---|---|---|---|---|
| 6,772,110 | B2 * | 8/2004 | Real | G06F 9/453 715/708 |
| 6,999,916 | B2 * | 2/2006 | Lin | G06F 40/58 704/8 |
| 10,839,164 | B1 * | 11/2020 | Shorter | G06F 40/205 |
| 11,651,039 | B1 * | 5/2023 | Soubbotin | G06F 16/2428 707/706 |
| 2001/0027460 | A1 * | 10/2001 | Yamamoto | G06F 40/58 715/264 |
| 2009/0177460 | A1 * | 7/2009 | Huang | G06F 40/44 704/2 |
| 2010/0057439 | A1 * | 3/2010 | Ideuchi | G06F 40/42 704/7 |

(Continued)

OTHER PUBLICATIONS

Hyun Kim et al., "QE BERT: Bilingual BERT using multi-task learning for neural quality estimation", In Proceedings of the WMT-2019, pp. 85-89, Aug. 1-2, 2019.

(Continued)

*Primary Examiner* — Michael Colucci
(74) *Attorney, Agent, or Firm* — IPUSA, PLLC

(57) ABSTRACT

An estimation apparatus includes: an input part configured to receive, as inputs, an extended word alignment between a source sentence and a translated sentence, and translation quality tags between the source sentence and the translated sentence; and an edit tag estimation part configured to estimate an edit tag based on the extended word alignment and the translation quality tags.

4 Claims, 14 Drawing Sheets

(56) References Cited

U.S. PATENT DOCUMENTS

| | | | | |
|---|---|---|---|---|
| 2015/0309994 | A1* | 10/2015 | Liu | G06F 40/45 704/2 |
| 2016/0350290 | A1* | 12/2016 | Fujiwara | G06F 40/51 |
| 2018/0107656 | A1* | 4/2018 | Oda | G06F 40/51 |
| 2019/0266249 | A1* | 8/2019 | Xu | G06F 40/103 |
| 2020/0064977 | A1* | 2/2020 | Wu | G06F 9/451 |
| 2022/0318523 | A1* | 10/2022 | Sheinin | G06F 40/289 |

OTHER PUBLICATIONS

Fabio Kepler et al., "Unbabel's participation in the WMT19 translation quality estimation shared task", In Proceedings of the WMT-2019, pp. 78-84, Aug. 1-2, 2019.

Masaaki Nagata et al., "A supervised word alignment method based on cross-language span prediction using multilingual BERT", In Proceedings of EMNLP-2020, pp. 555-565, Nov. 16-20, 2020.

* cited by examiner

FIG.12

| | En-De (F1/P/R) | En-Zh (F1/P/R) |
|---|---|---|
| FastAlign | 0.878/0.861/0.895 | 0.669/0.650/0.690 |
| AWESoME | 0.947/0.977/0.919 | 0.826/0.879/0.779 |
| mBERT | 0.952/0.978/0.927 | **0.839**/0.872/0.809 |
| ft-mBERT | **0.972**/0.970/0.973 | |

FIG.13

| | En-De | | En-Zh | |
|---|---|---|---|---|
| | SOURCE SENTENCE MCC | MACHINE-TRANSLATED SENTENCE MCC | SOURCE SENTENCE MCC | MACHINE-TRANSLATED SENTENCE MCC |
| OpenKiwi | 0.266 | 0.358 | 0.248 | 0.520 |
| mBERT | 0.340 | **0.457** | **0.357** | 0.570 |
| XLM-R | **0.345** | 0.453 | 0.354 | **0.592** |

FIG.14

| EXTENDED WORD ALIGNMENT | TRANSLATION QUALITY TAG | SOURCE SENTENCE F1 | | MACHINE-TRANSLATED SENTENCE F1 | |
|---|---|---|---|---|---|
| | | AVERAGE | (OK/REP/INS) | AVERAGE | (OK/REP/DEL) |
| FastAlign | OpenKiwi | 0.647 | (0.751/0.430/0.103) | 0.659 | (0.768/0.439/0.084) |
| mBERT | mBERT | 0.738 | (0.836/0.517/0.331) | 0.734 | (0.835/0.519/0.270) |
| mBERT | XLM-R | 0.716 | (0.797/0.538/0.325) | 0.712 | (0.795/0.542/0.298) |
| ft-mBERT | mBERT | **0.753** | (0.857/0.515/0.349) | **0.745** | (0.854/0.510/0.262) |
| ft-mBERT | XLM-R | 0.724 | (0.802/0.548/0.386) | 0.687 | (0.764/0.534/0.288) |

FIG.15

| EXTENDED WORD ALIGNMENT | TRANSLATION QUALITY TAG | SOURCE SENTENCE F1 AVERAGE (OK/REP/INS) | MACHINE-TRANSLATED SENTENCE F1 AVERAGE (OK/REP/DEL) |
|---|---|---|---|
| FastAlign | OpenKiwi | 0.466(0.503/0.289/0.057) | 0.538(0.594/0.285/0.152) |
| mBERT | mBERT | 0.837(0.927/0.380/0.170) | 0.817(0.911/0.376/0.228) |
| mBERT | XLM-R | **0.843**(0.931/0.371/0.140) | **0.829**(0.925/0.365/0.242) |

ESTIMATION APPARATUS, LEARNING APPARATUS, ESTIMATION METHOD, LEARNING METHOD, AND PROGRAM

TECHNICAL FIELD

The present disclosure relates to translation quality estimation and providing assistance in editing (proof-reading) translation results.

BACKGROUND ART

In the field of word-level quality estimation for machine translation, there is a technique disclosed in non-patent document 1.

In the technique disclosed in non-patent document 1, words in a source sentence, words in its machine-translated sentence, and gaps in the machine-translated sentence are all labeled with quality tags based on a binary classification of "OK" and "BAD."

RELATED-ART DOCUMENT

Non-Patent Document

Non-Patent Document 1: Hyun Kim, Joon-Ho Lim, Hyun-Ki Kim, and Seung-Hoon Na. QE BERT: Bilingual BERT using multi-task learning for neural quality estimation. In Proceedings of the WMT-2019, pp. 85-89, 1999.

SUMMARY OF THE INVENTION

Problem to be Solved by the Invention

Existing word-level quality estimation techniques can identify where an error exists by looking at quality tags; still, it is not possible to determine which part of the source sentence the error corresponds to. Therefore, when a person post-edits a machine-translated sentence, he/she faces the challenge of having to decide what needs to be corrected and how. Note that similar issues arise when applying existing word-level quality estimation techniques to translations other than machine-translated sentences (for example, translations by humans).

The present disclosure has been made in view of the foregoing, and aims to provide a technique that makes it possible to estimate what edit operations need to be performed when post-editing a translated sentence.

Means for Solving the Problem

According to the technique disclosed herein, an estimation apparatus includes: an input part configured to receive, as inputs, an extended word alignment between a source sentence and a translated sentence, and translation quality tags between the source sentence and the translated sentence; and an edit tag estimation part configured to estimate an edit tag based on the extended word alignment and the translation quality tags.

Effect of the Invention

According to the present disclosure, a technique is provided whereby it is possible to estimate what edit operations need to be performed when post-editing a translated sentence.

BRIEF DESCRIPTION OF THE DRAWINGS

FIG. 12 is a diagram showing the accuracy of extended word alignment;

FIG. 13 is a diagram showing the accuracy of labeling of translation quality tags;

FIG. 14 shows the accuracy (En-De) of labeling of edit tags; and

FIG. 15 shows the accuracy (En-Zh) of labeling of edit tags.

DETAILED DESCRIPTION OF THE PREFERRED EMBODIMENTS

Figure 1:
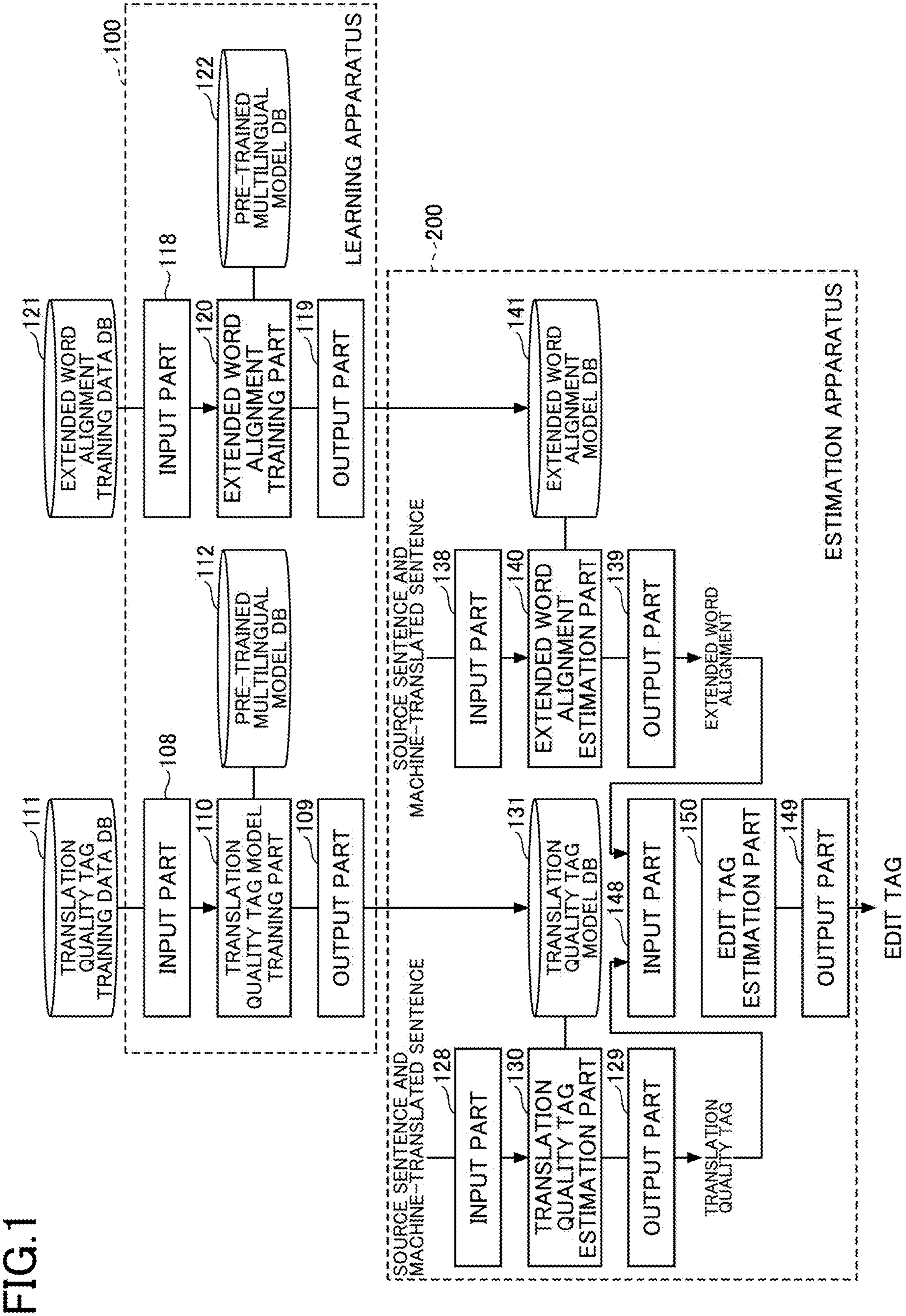
FIG. 1 shows an overall example structure of the system according to an embodiment of the present disclosure.

An embodiment of the present disclosure ("the present embodiment") will now be described with reference to the accompanying drawings. The embodiment described below is simply an example, and this is by no means the only embodiment to which the present disclosure can be applied.

The following description will focus on machine-translated sentences, but this is only an example. The present embodiment can also be applied to translations other than machine-translated sentences (for example, translations by humans). Also, although the present embodiment uses a supervised word alignment technique, it is also possible to use an unsupervised word alignment technique.

Furthermore, the systems and apparatuses described in the present embodiment all provide certain improvements over related techniques such as the technique disclosed in non-patent document 1, and mark an advancement in the field of translation quality estimation and the technique for providing assistance in the editing (proof-reading) of translated sentences.

Note that techniques described in the reference documents cited in the following description are in the public domain; however, parts in the following description explaining problems with the reference documents' techniques and solutions thereto are not in the public domain. The reference documents' numbers and titles are listed at the end of this specification. Reference documents in the following description are all numbered, such as "reference document [1]."

Summary of Embodiment

First, a summary of an embodiment of the present disclosure will be described. The technique according to the present embodiment is related to machine translation quality estimation. In the following description, summaries of techniques according to the present disclosure, their problems, and techniques that the present embodiment propose to solve these problems will be described.

Machine translation quality estimation generally refers to techniques for estimating the quality of machine translation systems' outputs without referring to reference translations. The quality estimation task [6], which is one of the shared tasks discussed in WMT (Conference on Machine Translation), which is a major international conference on machine translation, has two subtasks: word-level quality estimation and sentence-level quality estimation.

Word-level quality estimation refers to the process of labeling all words (source words) in a source sentence (input sentence), all words (target words) in its machine-translated sentence (output sentence), and all gaps in the machine-translated sentence, with one of two types of quality tags, namely "OK" and "BAD." Here, a gap refers to a position between neighboring words in a machine-translated sentence.

If a word in the source sentence is labeled with the quality tag "BAD," this indicates that the word is either mistranslated in the machine-translated sentence, or that the word is not translated in the machine-translated sentence. If a word in a machine-translated sentence is labeled with the quality tag "BAD," this indicates that the word is a mistranslation of the source sentence or that the word needs to be removed. If a gap is labeled with the quality tag "BAD," this indicates that one or more words needs to be inserted at the position of that gap in the machine-translated sentence.

Sentence-level translation quality estimation refers to the process of estimating the quality of a whole translated sentence. The quality scale to apply to a whole sentence may be HTER (Human Translation Error Rate), direct assessment, and so forth. HTER indicates how many edit operations are required to fix the translation errors. Direct assessment takes into account the accuracy and fluency of the machine translation of a source sentence and rates the quality of the translation using a number from 0 to 100.

If there is a combination of three, namely a source sentence ("SRC") that is input to a machine translation system, a machine-translated sequence ("MT") that is output from the machine translation system, and a post-edited sentence ("PE") that is obtained by manually post-editing the machine-translated sentence and that serves as a reference translation, the quality tag of each word can be automatically calculated based on the word alignment between the machine-translated sentence and the post-edited sentence, and the word alignment between the source sentence and the post-edited sentence.

The word alignment between the machine-translated sentence and its post-edited sentence can be determined using a monolingual word alignment tool, such as one included in a tool that calculates TER (Translation Edit Rate).

The word alignment between the source sentence and its machine-translated sentence can be determined using a bilingual word alignment tool such as GIZA++, FastAlign, or the like.

Given the resulting data, in which the source sentence and the machine-translated sentence are paired and labeled with word-level quality tags, a model for performing word-level quality estimation automatically can be pre-trained using a machine learning technique such as neural networking [8 and 9].

Existing word-level quality estimation techniques such as those described above can identify where an error exists in a machine-translated sentence based on quality tags; nevertheless, which part of the source sentence the error corresponds to cannot be specified. Therefore, when a person post-edits a machine-translated sentence, he/she faces the challenge of having to decide what needs to be corrected and how.

For example, if a word in a machine-translated sentence is labeled "BAD," it is not possible to determine whether the word is translated incorrectly and needs to be corrected, or whether the word expresses content that is not in the source sentence and therefore needs to be deleted. Also, assuming that a gap in the machine-translated sentence is labeled "BAD," it is not still clear which word in the source sentence has to be translated and inserted there.

In the present embodiment, an estimation apparatus 200, which will be described later, can not only find correctly translated word pairs between a source sentence and its machine-translated sentence (in which a word in each sentence is a translation of a word in the other sentence), but can also find incorrectly translated word pairs. The function to find correctly translated and incorrectly translated word pairs is referred to as "extended word alignment." Word pairs including both correctly translated word pairs and incorrectly translated word pairs may be referred to as "extended word alignment."

Furthermore, according to the present embodiment, based on the extended word alignment, the estimation apparatus 200 sub-divides the word-level translation quality tag "BAD" into the following three tags: insert ("INS"), delete ("DEL"), and replace ("REP"). Here, "INS," "DEL," and "REP," are tags that stand for operations that the post-editor should perform, and are referred to as "edit tags." The combination of edit tags and OK may be referred to as "refined quality tags." Note that the combination of edit tags and OK may be referred to as "edit tags" as well.

If a word in a source sentence is labeled "BAD" and no corresponding word can be found in its machine-translated sentence, the translation of the word needs to be inserted in the machine-translated sentence, and so the source word is labeled with the tag "INS." If a word in the source sentence is labeled "BAD" and there is a corresponding word in the machine-translated sentence, then the word in the machine-translated sentence needs to be replaced with the correct translation of the word in the source sentence, and so the source word is labeled with the tag "REP."

If a word in the machine-translated sentence is labeled "BAD" and no corresponding word can be found in the source sentence, then that word needs to be deleted from the machine-translated sentence, and so the machine-translated word is labeled with the tag "DEL." If, however, there is a corresponding word in the source sentence, the word in the machine-translated sentence needs to be replaced with the correct translation of the word in the source sentence, and so the machine-translated word is labeled with the tag "REP."

The present embodiment is designed such that, as in existing word-level translation quality estimation, every word in a source sentence in the source language and every word in a machine-translated sentence in the target language are labeled with a machine translation quality tag. In addition, the present embodiment is designed such that, by determining the extended word alignment between a source sentence and its machine-translated sentence, quality tags that sub-divide the edit operations that the post-editor should perform, such as "INS," "REP," "DEL," and so forth can be presented.

In the following description, first, to help understand the technique according to the present embodiment, for example, various reference techniques related to machine translation quality estimation and their problems will be described. Following that, the structure and operation of the system and apparatus according to the present embodiment will be explained.

(Reference Techniques)

<Word-Level Quality Estimation Based on Predictor-Estimator Model>

The predictor-estimator model is presently the standard method of translation quality estimation used in machine translation quality estimation. Unbabel's system, which has achieved the best performance in the quality estimation task, which is one of the shared tasks discussed at WMT-2019, the most important international conference on machine translation, is based on a predictor-estimator model [8] using a transformer [14] that achieves excellent performance in machine translation.

OpenKiwi, which is specified as the baseline system for the word-level quality estimation task at the international conference WMT, also uses a predictor-estimator model.

The predictor is a model that predicts each token in a machine-translated sentence from the context before and after that token in the source sentence and the machine-translated sentence. The predictor is formed with: a transformer encoder that encodes the source sentence; a transformer decoder that predicts a word in a machine-translated sentence using the words from the beginning of the machine-translated sentence up to the word immediately preceding the word to be predicted; and a transformer decoder that predicts a word using the words from the end of the machine-translated sentence up to the word immediately after the word to be predicted.

The estimator is a model that estimates the quality tags ("OK" or "BAD") for words based on features generated by the above predictor. To be more specific, the quality tag for a word is predicted using information obtained from the source-sentence encoder, the decoder that handles the machine-translated sentence from its beginning to the word immediately before the word subject to prediction, and the decoder that handles the end of the machine-translated sentence from its end to the word immediately after the word subject to prediction.

<Pre-Trained Language Model BERT>

BERT [3] is a language representation model to output word vectors per word in an input sequence by taking into account the enclosing context of each word, using transformer-based encoders. Typically, an input sequence is a sentence or two sentences concatenated with a special symbol between them.

BERT pre-trains a language representation model based on large-scale language data, using a masked language model training task and a next-sentence prediction task. The masked language model training task predicts a masked word in an input sequence from both forward and backward directions. The next-sentence prediction task determines whether two given sentences are neighboring sentences. Using these pre-training tasks, BERT can output word vectors that capture language phenomenon-related features not only within a single sentence but also across two sentences. Note that a language representation model such as BERT may be simply referred to as a "language model."

It has been reported that, by adding an appropriate output layer to a pre-trained BERT and fine-tuning it with training data for the target task, it is possible to achieve the highest accuracy in a variety of tasks, such as semantic text similarity, natural language inference (recognizing textual entailment), question and answer, and named entity recognition.

BERT was originally created for English, but many versions have been created for various languages including Japanese, and are available to the public. "Multilingual BERT" has been created using monolingual data for 104 languages extracted from Wikipedia and has been made publicly available.

In addition, a cross-language model referred to as "XLM," which is pre-trained based on a masked language model using bilingual (parallel) sentence pairs, has been proposed and reported to be more accurate than multilingual BERT in certain applications such as cross-language text classification [2]. In addition, XLM-R, which is pre-trained from large-scale monolingual text in many languages without using bilingual sentence pairs, has been reported to be more accurate than XLM [1]. The pre-trained models for XLM and XLM-R are also publicly available.

<Word-Level Quality Estimation Using a Pre-Trained Multilingual Model>

ETRI, a public research institute in Korea, has proposed a word-level quality estimation method using BERT [9] (non-patent document 1). First, a "gapped machine-translated sentence" is created by inserting a token "[GAP]," which provides a gap, between every two neighboring words in a machine-translated sentence. Next, the source sentence and the machine-translated sentence are concatenated, thereby creating a sequence to be input to BERT, referred to as a "[CLS] source sentence [SEP] gapped machine-translated sentence [SEP]." [CLS] here is a special token for creating a vector that aggregates information of two source sentences, and [SEP] is a token for marking the boundary between sentences.

A neural network receives as inputs the vectors output from BERT for the words in the source sentence, the words in the machine-translated sentence, and the gaps in the machine-translated sentence, and each vector is labeled with a quality tag based on a binary classification of OK and BAD.

To determine the quality of a whole sentence, the vector output by BERT in response to [CLS] is received as an input, and, based on this, the value of HTER is predicted using the neural network.

<Word Alignment Using Pre-Trained Multilingual Model>

Word alignment between bilingual sentence pairs is often determined using a word alignment method based on a statistical machine translation model such as GIZA++ [12] or FastAlign [5]. However, in recent years, a word alignment technique that significantly outperforms GIZA++ and FastAlign by using a pre-trained multilingual model has been proposed.

The reference document [11] discloses a supervised word alignment method. Using a question answering technique based on BERT, this method determines word alignment based on cross-language span prediction, in which a word in one sentence in a bilingual sentence pair is used as a question, and the span of the other sentence (continuing word sequence), which is its translation, is used as an answer. This method provides an advantage of achieving high accuracy with a small amount of training data, approximately 300 sentences, for example.

The reference document [4] describes AWESoME, a word alignment method that works robustly across a variety of language pairs by fine-tuning a pre-trained multilingual model using parallel sentence pair data based on an objective function that improves the accuracy of word alignment. This method is significantly more accurate than statistical translation model-based word alignment methods such as GIZA++ and FastAlign. However, when training data is available, the supervised word alignment method disclosed in the reference document [11] is more accurate.

About the Problems

Existing word-level quality estimation techniques can identify which words in the source sentence are translated incorrectly, and which words or gaps (between words) in the machine-translated sentence are not correct translations. However, existing word-level quality estimation techniques have the problem that they cannot provide information as to, for example, which part of the source sentence an error in the machine-translated sentence corresponds to, what edit operations (insert, delete, replace, etc.) need to be performed based on the alignment between the source sentence and the machine-translated sentence, and so forth.

The reference document [13] reports that displaying word alignment is helpful when post-editing machine translations. In the event translation quality is poor, showing the word alignment leads to a statistically significant improvement in the quality of post-editing. In the event translation quality is high, showing the word alignment reduces the time of post-editing, but this is not statistically significant. In the reference document [13], functions from a statistical machine translation decoder Moses [10] are used to display the word alignment between the source sentence and its machine-translated sentence.

Although neural machine translation allows for significantly higher translation accuracy than statistical machine translation, the problem is that it cannot easily indicate the word alignment between the source sentence and the machine-translated sentence as statistical translation can. The reference document [7] describes a method for determining the word alignment and creating translation simultaneously in neural machine translation. The accuracy of word alignment is comparable to that of GIZA++. The supervised word alignment disclosed in the reference document [11] is significantly more accurate than GIZA++. The method presumes receiving as inputs a pair of source and translated sentences in which one is a translation of the other. Consequently, the problem with the method is that it is unclear whether supervised word alignment will work robustly in case there are mistranslations between the source sentence and the machine-translated sentence such that one is not necessarily a translation of the other.

Detailed Explanation of Technique According to Embodiment

The technique according to the present embodiment will be described in detail below.

According to the present embodiment, extended word alignment between a source sentence and its machine-translated sentence is determined based on supervised word alignment, and the extended word alignment is then combined with word-level translation quality estimation to estimate the quality tags, which are sub-divided into edit operations that need to be performed upon post-editing such as INS, DEL, and REP.

Example Structure of Apparatus

FIG. 1 shows an overall example structure of a system according to the present embodiment. A system obtained by removing the translation quality tag training data DB 111 and the extended word alignment training data DB 121 from the structure shown in FIG. 1 is referred to as an "edit tag estimation system." The edit tag estimation system may also be referred to as an "edit tag estimation apparatus." The translation quality tag training data DB 111 and the extended word alignment training data DB 121 may be included in the edit tag estimation system.

As shown in FIG. 1, the edit tag estimation system includes an extended word alignment training part 120, a pre-trained multilingual model DB 122, an extended word alignment estimation part 140, an extended word alignment model DB 141, a translation quality tag model training part 110, a pre-trained multilingual model DB 112, an estimation quality tag model estimation part 130, a translation quality tag model DB 131, an edit tag estimation part 150, input parts 108, 118, 128, 138, and 148, and output parts 109, 119, 129, 139, and 149.

A learning apparatus 100 may be structured to include the translation quality tag model training part 110, the pre-trained multilingual model DB 112, the extended word alignment training part 120, and the pre-trained multilingual model DB 122. Alternatively, the learning apparatus 100 may be structured to include "the translation quality tag model training part 110 and the pre-trained multilingual model DB 112," but not "the extended word alignment training part 120 and the pre-trained multilingual model DB 122." The learning apparatus 100 may also be structured to include "the extended word alignment training part 120 and the pre-trained multilingual model DB 122," but not "the translation quality tag model training part 110 and the pre-trained multilingual model DB 112."

Figure 2:
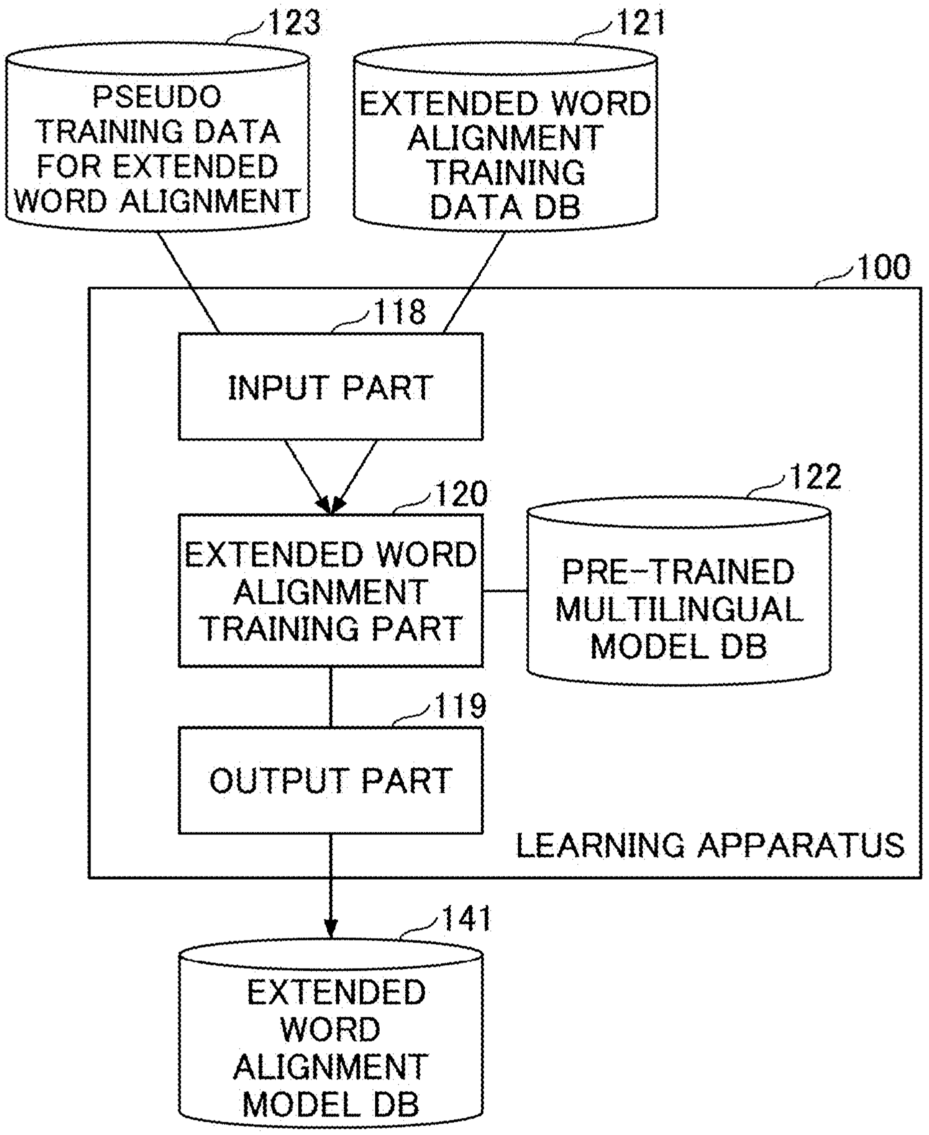
FIG. 2 shows an example structure of a learning apparatus 100.

FIG. 2 shows an example of the learning apparatus 100 including the extended word alignment training part 120, the pre-trained multilingual model DB 122, the input part 118, and the output part 119. In the example shown in FIG. 2, pseudo training data for extended word alignment is used. An example of an operation using this will be described later.

Also, an estimation apparatus 200 may be structured to include the estimation quality tag model estimation part 130, the translation quality tag model DB 131, the extended word alignment estimation part 140, the extended word alignment model DB 141, the edit tag estimation part 150, the input parts 128, 138, and 148, and the output parts 129, 139, and 149.

The estimation apparatus 200 may be structured to include "the estimation quality tag model estimation part 130, the translation quality tag model DB 131, the extended word alignment estimation part 140, and the extended word alignment model DB 141," but not "the edit tag estimation part 150."

The estimation apparatus 200 may also be structured to include "the edit tag estimation part 150" and not include "the estimation quality tag model estimation part 130, the translation quality tag model DB 131, the extended word alignment estimation part 140, and the extended word alignment model DB 141."

The estimation apparatus 200 may also be structured to include "the estimation quality tag model estimation part 130 and the translation quality tag model DB 131," but not "the extended word alignment estimation part 140, the extended word alignment model DB 141, and the edit tag estimation part 150."

The estimation apparatus 200 may also be structured to include "the extended word alignment estimation part 140 and the extended word alignment model DB 141," but not "the estimation quality tag model estimation part 130, the translation quality tag model DB 131, and the edit tag estimation part 150."

The estimation apparatus 200 may also be structured to include "the extended word alignment estimation part 140, the extended word alignment model DB 141, and the edit tag estimation part 150," but not "the estimation quality tag model estimation part 130 and the translation quality tag model DB 131."

Figure 3:
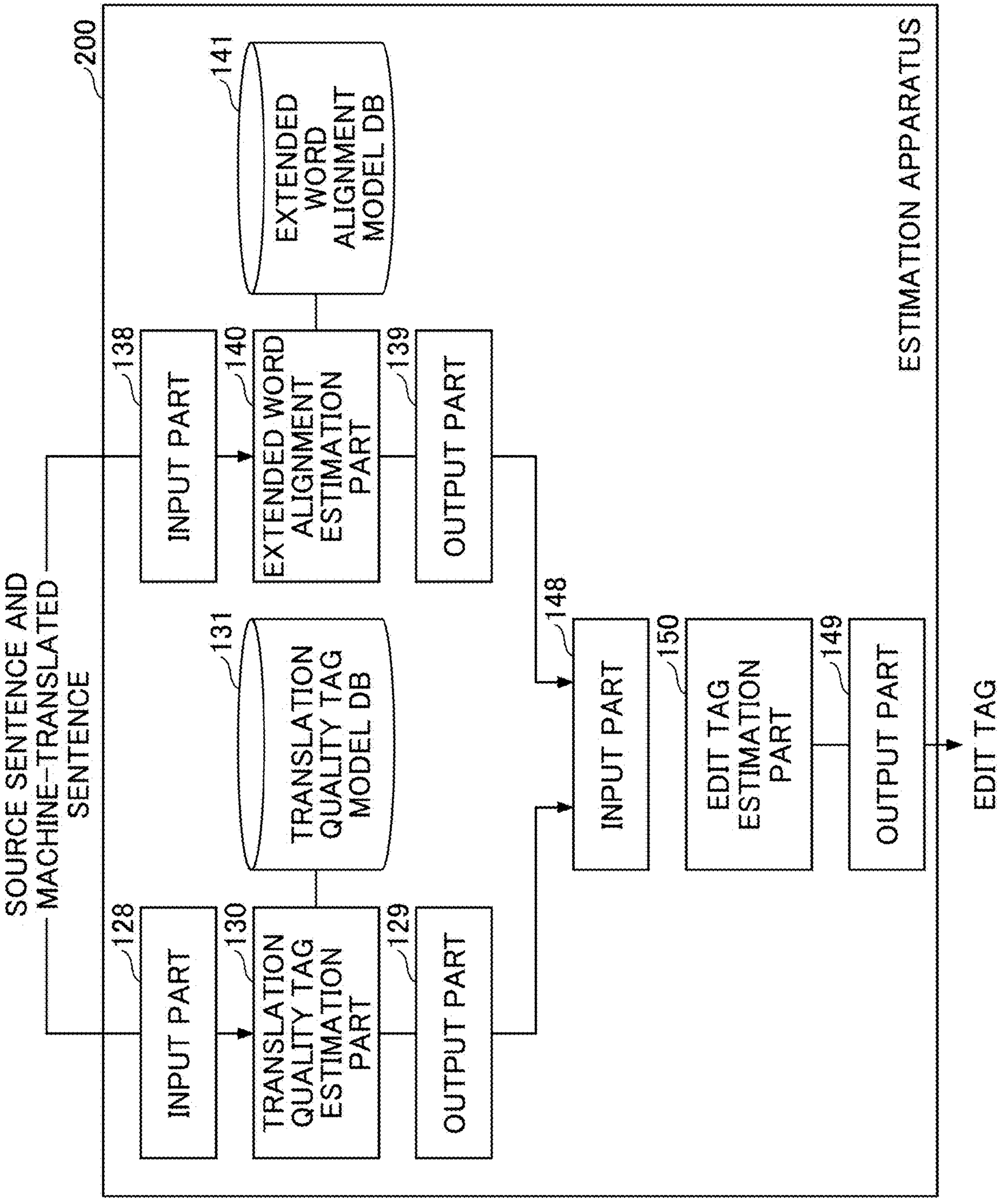
FIG. 3 shows an example structure of an estimation apparatus 200.

FIG. 3 shows an example of the estimation apparatus 200 including the estimation quality tag model estimation part 130, the translation quality tag model DB 131, the extended word alignment estimation part 140, the extended word alignment model DB 141, and the edit tag estimation part 150.

Summary of Example Operation

A summary of the operation of each part in the edit tag estimation system will be described with reference to the flowcharts of FIG. 4 and FIG. 5.

Figure 4:
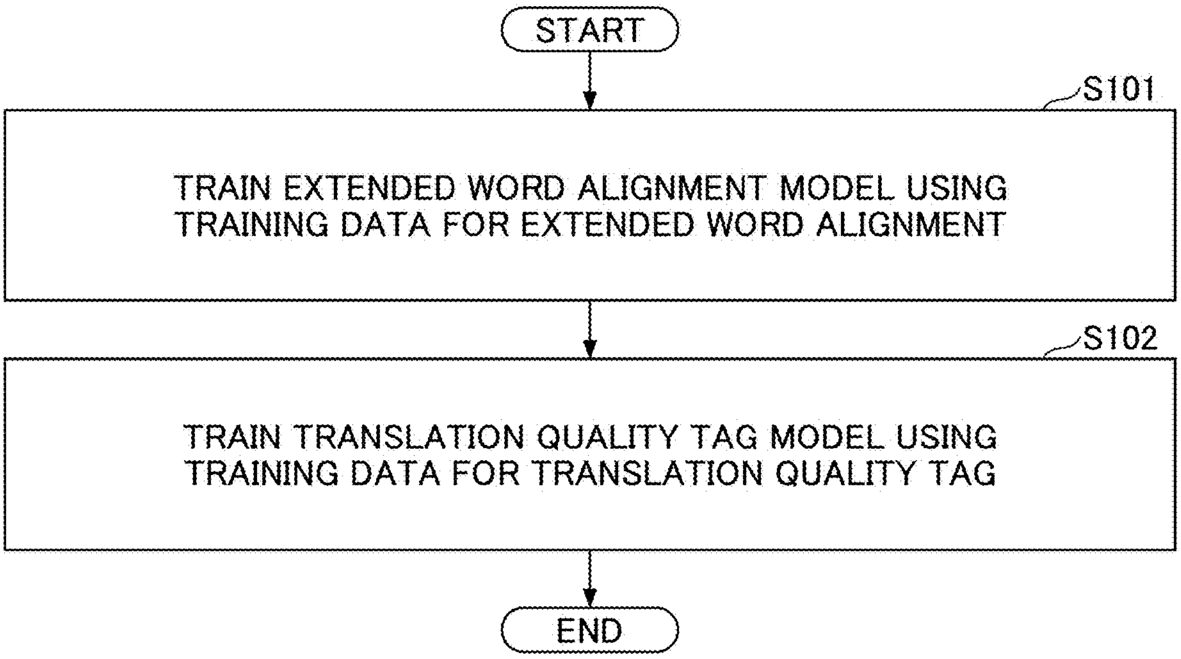
FIG. 4 is a diagram showing the steps of training an extended word alignment model and a translation quality model.
Figure 5:
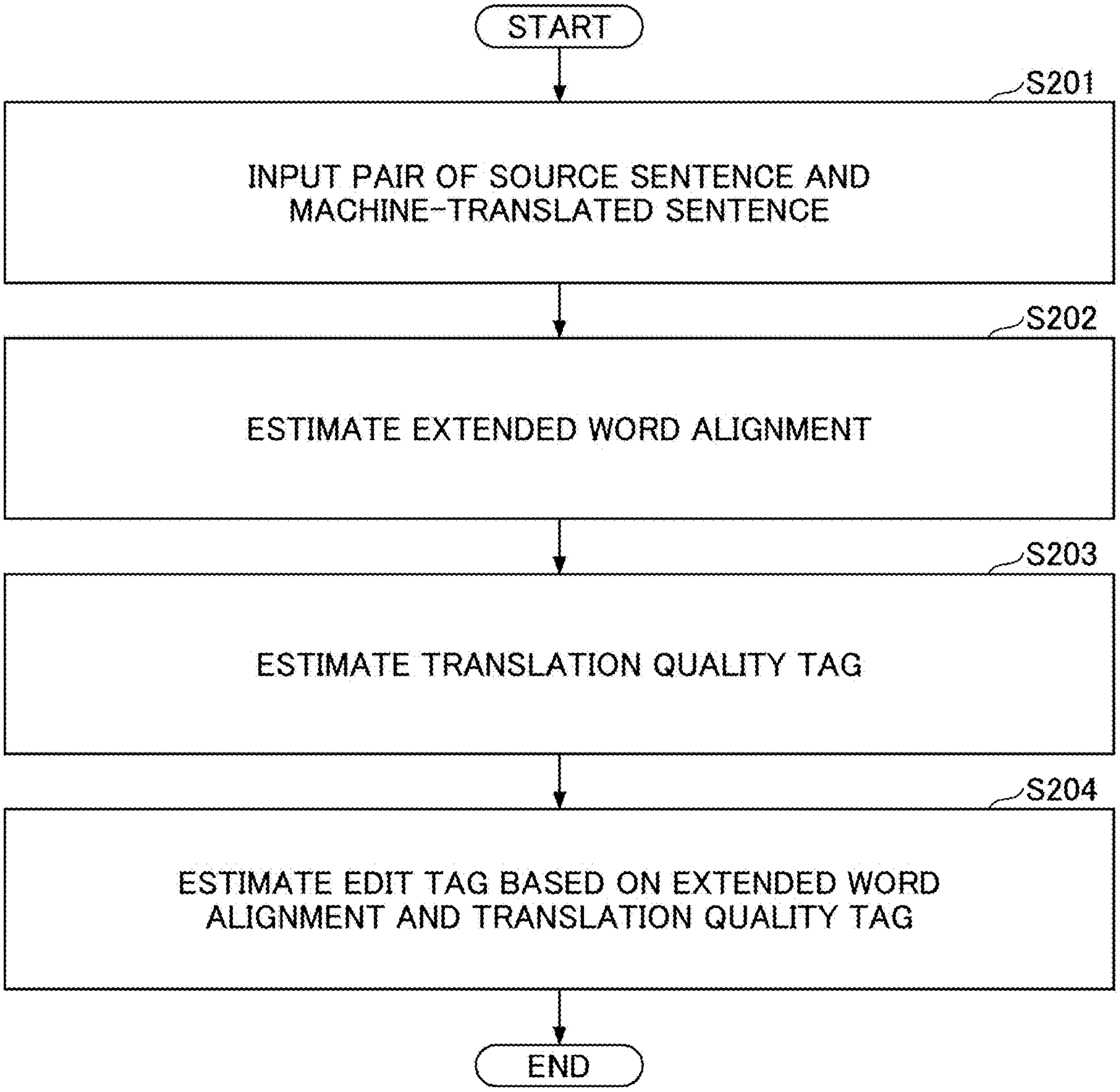
FIG. 5 is a diagram showing the steps for estimating extended word alignment and edit tags.

FIG. 4 shows the steps of training an extended word alignment model and a translation quality model. Here, assume that extended word alignment training data is stored in the extended word alignment training data DB 121, and that translation quality tag training data is stored in the translation quality tag training data DB 111. The pre-trained multilingual model DBs 112 and 122 each store a pre-trained multilingual model.

Note that a "model" as used in the present embodiment refers to a neural network model. To be more specific, this is data consisting of weight parameters, functions, and the like.

In step S101, the extended word alignment training part 120 receives the training data for extended word alignment, as an input, from the extended word alignment training data DB 121, via the input part 118. Using this training data, the extended word alignment training part 120 fine-tunes a pre-trained multilingual model read from the pre-trained multilingual model DB 122, thereby creating an extended word alignment model. The created extended word alignment model is output from the output part 119 and stored in the extended word alignment model DB 141.

Note that "fine-tuning" means training a target model (a model that adds an output layer to a pre-trained multilingual model) using the parameters of a pre-trained model as initial values of the target model.

In step S102, the translation quality tag model training part 110 receives training data for translation quality tags as an input from the translation quality tag training data DB 111 via the input part 108, and creates a translation quality tag model by fine-tuning a pre-trained multilingual model read from the pre-trained multilingual model DB 112 using the training data. The created translation quality tag model is output from the output part 109 and stored in the translation quality tag model DB 131.

Note that the order of steps S101 and S102 may be reversed, or steps S101 and S102 may be executed simultaneously.

Next, the steps for estimating the extended word alignment and edit tags will be described with reference to the flowchart of FIG. 5.

In S201, a pair of a source sentence and a machine-translated sentence is input to both the extended word alignment estimation part 140 and the translation quality tag estimation part 130 via the input parts 138 and 128.

In S202, the extended word alignment estimation part 140 estimates the extended word alignment between the input pair of the source sentence and the machine-translated sentence using an extended word alignment model read from the extended word alignment model DB 141, and outputs the result from the output part 139.

In S203, the translation quality tag estimation part 130 estimates the translation quality tags for the input pair of the source sentence and the machine-translated sentence using a translation quality tag model read from the translation quality tag model DB 131, and outputs the results from the output part 129.

In S204, the edit tag estimation part 150 receives the extended word alignment and the translation quality tags as inputs from the input part 148, estimates the edit tags, and outputs the edit tags from the output part 149. The order of steps S202 and S203 may be reversed, or steps S202 and S203 may be executed simultaneously.

Figure 7:
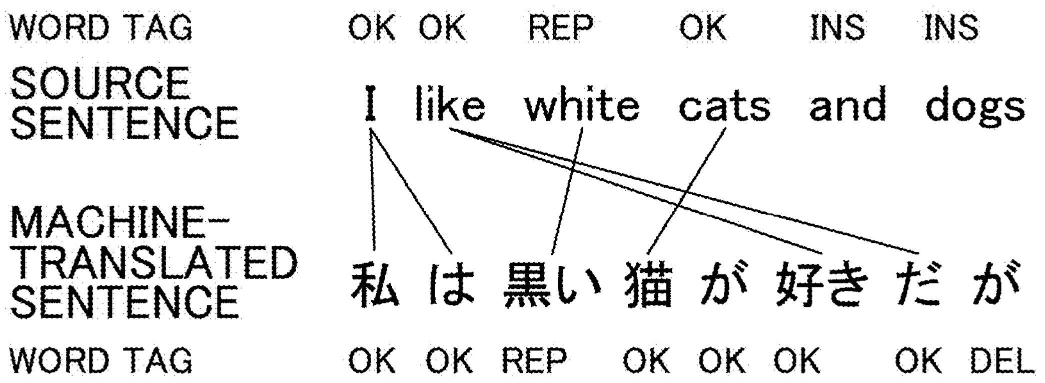
FIG. 7 is a diagram showing an example of an output of an edit tag estimation part 150.

The format in which the edit tags are output is not limited to a specific format. For example, as shown in FIG. 7 described later, edit tags may be output together with the source sentence, the machine-translated sentence, and the extended word alignment between the source sentence and its machine-translated sentence.

Note that the edit tag estimation part 150 may not be provided, and the output part 149 may output the translation quality tags and the extended word alignment.

The processing operations in the edit tag estimation system will be described in more detail below.

(Extended Word Alignment and Edit Tags: Example Operation of Edit Tag Estimation Part 150)

Figure 6:
FIG. 6 is a diagram showing an example of outputting a result of word-level quality estimation according to related art.

FIG. 6 shows an example in which a result of word-level quality estimation in quality estimation, which is one of the shared tasks at the international conference WMT, is output. FIG. 7 shows an example output of the edit tag estimation part 150 of the present embodiment. FIG. 6 is shown for comparison with FIG. 7. In FIG. 6 and FIG. 7, the source sentence and the machine-translated sentence are the same.

In the word-level quality estimation illustrated in FIG. 6, the word "white" in the source sentence is labeled with the tag "BAD," and the word "黒い" in the machine-translated sentence is labeled with the tag "BAD." However, related art fails to identify which pair of words is incorrectly translated. In this case, for example, it is not possible to determine whether "黒い" in the machine-translated sentence is a mistranslation, or whether there is a translation in the machine-translated sentence that finds no counterpart in the source sentence.

On the other hand, in the example of an output of the edit tag estimation part 150 according to the present embodiment shown in FIG. 7, the extended word alignment between a source sentence and its machine-translated sentence is shown. According to this extended word alignment, a correctly translated word pair such as "I" in the source sentence and "私" and "は" in the machine-translated sentence, and an incorrectly translated word pair such as "white" in the source sentence and "黒い" in the machine-translated sentence are both associated with each other.

Also, in the existing word-level quality estimation shown in FIG. 6, only two types of translation quality tags can be assigned to words: "OK" and "BAD." As shown in FIG. 7, the edit tag estimation part 150 of the present embodiment sub-divides the tag "BAD" into smaller edit tags such as "REP," "INS," and "DEL," based on the combination of the translation quality tag and the extended word alignment.

That is, if a pair of words are labeled with the translation quality tag "BAD" in both the source sentence and the machine-translated sentence and associated with each other in the extended word alignment, the edit tag estimation part 150 labels these words with the replace tag "REP," indicating that the word in the machine-translated sentence needs to be replaced with the correct translation of the word in the source sentence. The word pair "white" and "黒い" in FIG. 7 is an example labeled with the tag "REP."

If a word is labeled with the tag "BAD" in the source sentence and finds no counterpart in the extended word alignment (that is, there is no corresponding word in the machine-translated sentence), the word is labeled with the tag "INS," indicating that a translation of that word needs to be inserted in the machine-translated sentence. In FIG. 7, "and" and "dogs" are examples of words that are labeled with the tag "INS."

Also, if a word is labeled with the tag "BAD" in the machine-translated sentence and finds no counterpart in the extended word alignment (that is, there is no corresponding word in the machine-translated sentence), the edit tag estimation part 150 labels the word with the tag "DEL," indicating that the word needs to be deleted from the machine-translated sentence. "が" in FIG. 7 is an example labeled with the tag "DEL."

The edit tag estimation part 150 can carry out the above edit tag labeling operation based on a program incorporating the above rules. Also, the edit tag estimation part 150 can be implemented by a neural network having learned the above edit tag labeling operation.

(Extended Word Alignment Estimation and Model Training)

Figure 8:
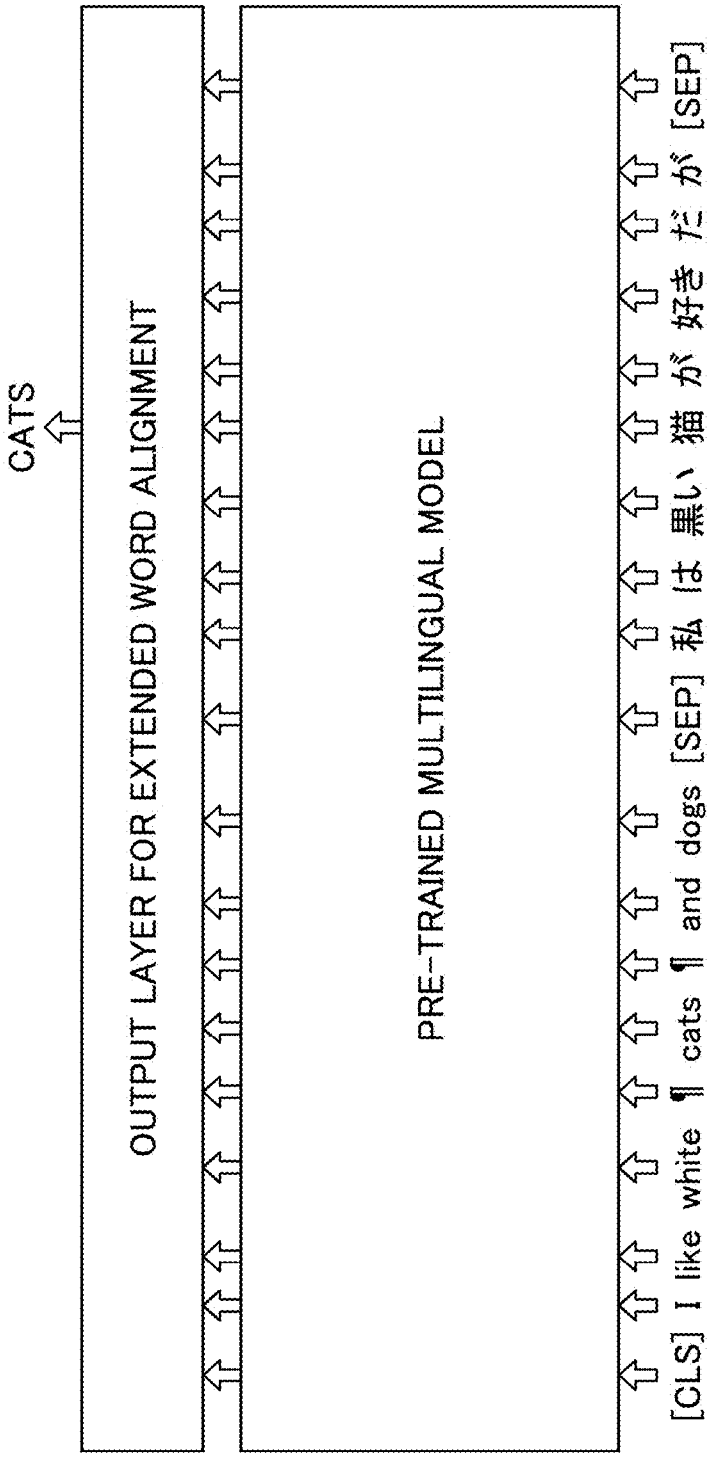
FIG. 8 is a diagram showing a structure of an extended word alignment model.

FIG. 8 shows a structure of an extended word alignment model. FIG. 8 may be interpreted as showing a structure of the extended word alignment estimation part 140. FIG. 8 may also be interpreted as showing an extended word alignment model subject to training (under training) in the extended word alignment training part 120. Referring to FIG. 8, the extended word alignment model has a structure in which an extended word alignment output layer is added to a pre-trained multilingual model.

Below, a method of estimating the extended word alignment based on an extended word alignment model and a method of training the extended word alignment model will be described in detail.

<On Training Data>

According to the present embodiment, training data for extended word alignment is created using either a manual method or the automatic method described below, and the supervised word alignment method disclosed in the reference document [11] is used to train an extended word alignment model by using the training data, and to estimate the extended word alignment based on the extended word alignment model.

The reference document [11] discloses a supervised word alignment method that, using a BERT-based question answering technique, determines word alignment based on cross-language span prediction, in which a word in one sentence in a bilingual sentence pair is used as a question, and the span of the other sentence (continuing word sequence), which is its translation, is used as an answer. This method provides an advantage of achieving high accuracy with a small amount of training data, approximately 300 sentences, for example.

To create the training data (reference data) for extended word alignment manually, for example, as shown in FIG. 7, a source sentence and its machine-translated sentence are created, the extended word alignment between these sentences is manually determined, and information indicating the source sentence, the machine-translated sentence, and the extended word alignments may be stored in the extended word alignment training data DB 121. Note that extended word alignment training data that is created manually may be referred to as "reference data."

It is also possible to create training data for extended word alignment automatically by running a program on a computer. One approach (the first approach) is to use existing word alignment software with relatively high accuracy, such as the word alignment method "AWESoME," described in the reference document [4], to determine the word alignment between a source sentence and its machine-translated sentence, and use this as pseudo reference data for the extended word alignment. In this case, the pseudo reference data for the extended word alignment is stored in the extended word alignment training data DB 121, and the extended word alignment training part 120 trains an extended word alignment model by using the pseudo reference data as training data.

Figure 9:
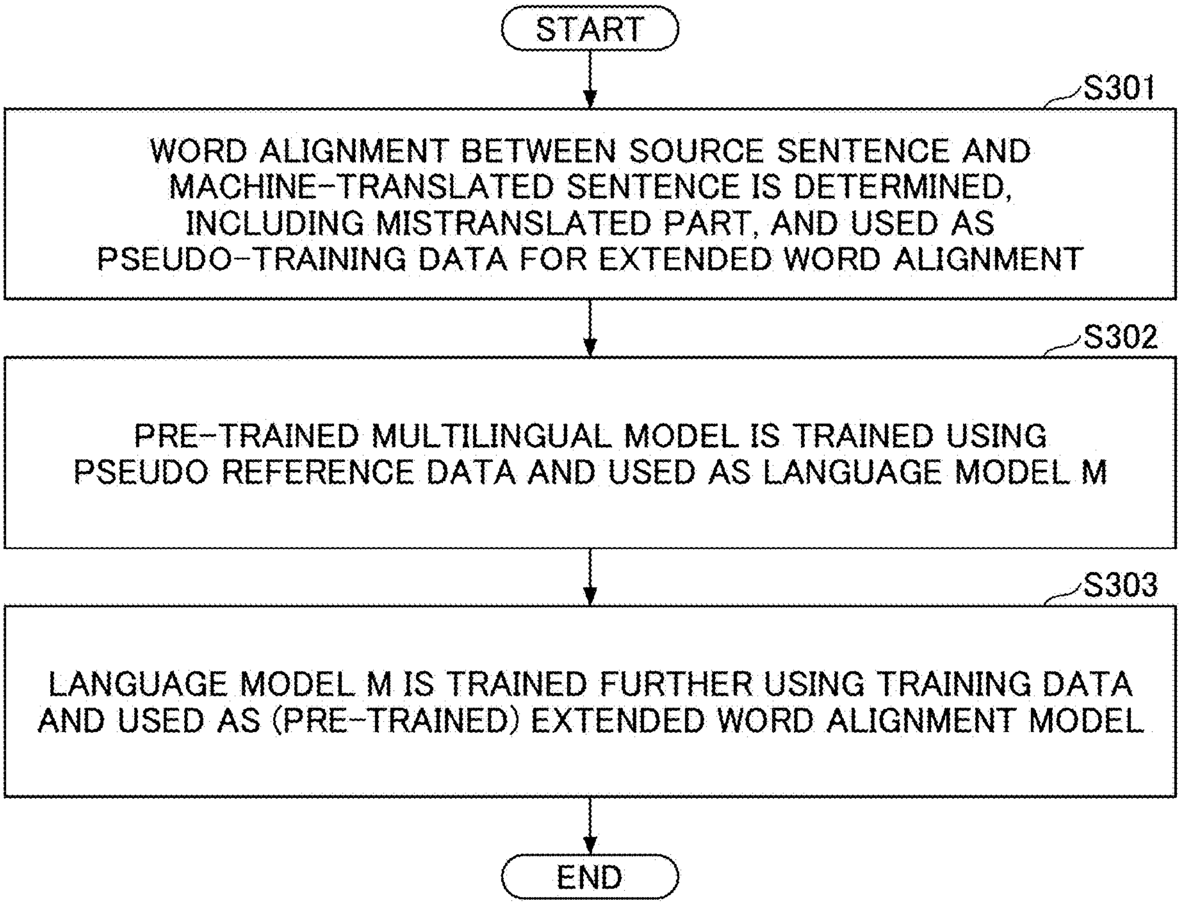
FIG. 9 is a diagram showing an example of the steps of a method of training an extended word alignment model.

Also, when using pseudo reference data as described above, it is possible to create an extended word alignment model using both pseudo reference data and manually-created training data (reference data). In this case, as in the example shown in FIG. 2, the extended word alignment training data DB 121 that stores manually-created training data and an extended word alignment pseudo training data DB 123 that stores pseudo reference data are provided. The step of training the extended word alignment model in this case will be described below with reference to FIG. 9.

In S301, the word alignment between the source sentence and the machine-translated sentence is determined, including mistranslations, and stored in the extended word alignment pseudo training data DB 123 as pseudo training data for the extended word alignment. This pseudo training data may be created using AWESoME described above, or may be created using different software.

In S302, the extended word alignment training part 120 trains the pre-trained multilingual model by fine-tuning it using the pseudo reference data read from the extended word alignment pseudo training data DB 123, and sets the pre-trained model as a language model M.

In S303, the extended word alignment training part 120 further fine-tunes the language model M based on the training data (manually-created training data) read from the extended word alignment training data DB 121, thereby generating and outputting an (pre-trained) extended word alignment model. The extended word alignment model pre-trained in this flow corresponds to ft-mBERT (fine-tuned mBERT), which will be described later.

For a second method of creating training data for extended word alignment automatically by running a program on a computer, there is a method of determining the extended word alignment between a source sentence and its machine translation, from the word alignment between the source sentence and the post-edited sentence (reference translation) and the word alignment between the machine-translated sentence and the post-edited sentence, by referencing the words in the post-edited sentence.

The word alignment between the source sentence and the post-edited sentence, and the word alignment between the machine-translated sentence and the post-edited sentence may be determined manually or may be determined using existing word alignment software. The source sentence and the post-edited sentence are translations of each other; by using existing word alignment software such as AWESoME, their word alignment can be determined with relatively high accuracy. As for the word alignment between the post-edited sentence and the machine-translated sentence, monolingual word alignment software such as the one included in the tool for calculating TER can be used. Note that a similar method can be used to determine extended word alignment using a reference translation of the source sentence instead of a post-edited sentence. Any sentence that is considered to be a correct translation of the source sentence can be used in place of the post-edited sentence.

<On Estimation of Extended Word Alignment>

The method of estimating extended word alignment based on an extended word alignment model by the extended word alignment estimation part 140 of the present embodiment will be described. First, the extended word alignment estimation part 140 creates an "annotated source sentence," in which a word in the source sentence, for which the word alignment is to be determined, is enclosed by special delimiters (boundary marker) in the source sentence.

As for the delimiter in this case, the paragraph symbol "¶" is used, as in the reference document [11]. However, the paragraph symbol "¶" is only one example of such a delimiter, and any symbol may be used as long as it is included in the vocabulary of the pre-trained multilingual model and does not affect the language model-based probability estimation in a significant way.

The extended word alignment estimation part 140 places a special symbol, "[CLS]," at the beginning of the annotated source sentence, inserts another special delimiter, "[SEP]," between the annotated source sentence and its machine-translated sentence, and places the special delimiter "[SEP]" at the end of the machine-translated sentence.

Then, the extended word alignment estimation part receives the sequence "[CLS] annotated source sentence [SEP] machine-translated sentence [SEP]" as an input to the pre-trained multilingual model. FIG. 8 shows an input (and an output) for finding the word in the machine-translated sentence that corresponds to the word "cat" in the source sentence.

The pre-trained multilingual model outputs a corresponding vector for every word input. The vectors are input to an output layer that is added to a pre-trained multilingual model. The output layer predicts the start and end positions of the words in the machine-translated sentence that correspond to the words enclosed by special delimiters in the source sentence.

In FIG. 8, the extended word alignment output layer predicts the start and end positions of the word "cats" in the machine-translated sentence that corresponds to the word "cats" in the source sentence.

<Training of Extended Word Alignment Model>

The same process as that described above is basically performed when training the extended word alignment model in the extended word alignment training part 120. However, the input in this case is extended word alignment training data (or pseudo reference data), and the parameters are adjusted such that the error between the output and the correct answer is minimized.

This will be explained in more detail below.

Let the source sentence be $S=[s_1, s_2, \ldots, MK, s_i, MK, \ldots, s_m]$ and its machine-translated sentences be $T=[t_1, t_2, \ldots, t_n]$. Here, MK is the special symbol that encloses the word for which the word alignment is to be determined. m is the "sentence length" (for example, the number of words) of the source sentence. n is the "sentence length" (for example, the number of words) of the machine-translated sentence.

The extended word alignment training part 120 trains an extended word alignment model, based on training data for extended word alignment, such that word sequence (span) $T_{(j,k)}=[t_j, \ldots, t_k](1 \leq j \leq k \leq n)$ in the machine-translated sentence that corresponds to the word $s_i$ in the source sentence is identified. To be more specific, the extended word alignment training part 120 determines the parameters to minimize the following cross entropy loss:

$$\mathcal{L}_{s_i}^{align} = -\frac{1}{2}\left[\log\left(p_j^{start}\right) + \log\left(p_k^{end}\right)\right] \quad \text{[Mathematical formula 1]}$$

where $p_j^{start}$ is the probability that $t_j$ is the position where the span starts, and $p_k^{end}$ is the probability that $t_k$ is the position where the span ends.

<Bi-Directional Estimation and Training>

Span prediction might yield varying results depending on the direction. The extended word alignment estimation part 140 may identify the word sequence (span) in the source sentence that corresponds to each word in the machine-translated sentence in the same or substantially the same process as in the case of "source sentence→machine-translated sentence," thus identifying aligned points where the sum of the probabilities determined in both directions by span prediction is greater than or equal to a predetermined threshold. When training the extended word alignment model, the extended word alignment training part 120 may perform predictions in both directions in this manner, and train the extended word alignment model such that the error between the prediction results and the correct answer is minimized.

(Estimation of Translation Quality Tags and Training of Model)

Figure 10:
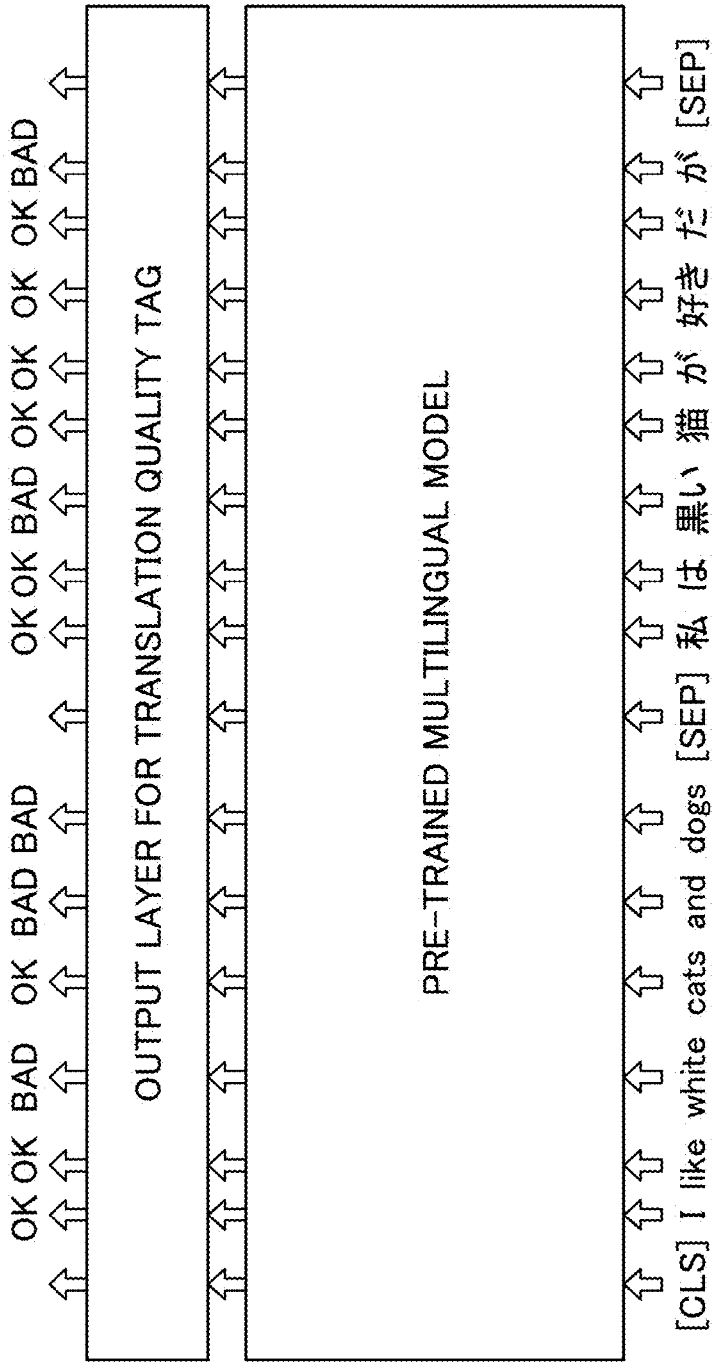
FIG. 10 is a diagram showing a structure of an estimation quality tag model.

FIG. 10 shows a structure of an estimation quality tag model. FIG. 10 may be interpreted as showing a structure of the translation quality tag estimation part 130. Also, FIG. 10 may be interpreted as showing an estimation quality tag model for a target that is subject to training (under training) in the translation quality tag model training part 110. As shown in FIG. 10, the estimation quality tag model has a structure in which an output layer for translation quality tags is added to a pre-trained multilingual model.

Below, the method of estimating translation quality tags using an estimation quality tag model and the method of training an estimation quality tag model will be described in detail.

<On Training of Data>

In the present embodiment, training data for translation quality tags is created using manual methods or the automated method described below.

To create training data (reference data) for translation quality tags manually, for example, as shown in FIG. 6, a source sentence and its machine-translated sentence may be prepared, and, after the translation quality tags are created manually, information indicating the source sentence, the machine-translated sentence, and the translation quality tags may be stored in the translation quality tag training data DB 111.

It is also possible to create training data for translation quality tags automatically by running a program (software) on a computer. One such method is to create training data for translation quality tags from the word alignment between a source sentence and its post-edited sentence and the word alignment between the post-edited sentence and the machine-translated sentence, based on the same or substantially the same process as in the method of creating reference data for word-level translation quality estimation discussed at the international conference WMT, disclosed in the reference document [6]. Note that the reference translation of the source sentence may be used instead of the post-edited sentence.

<On Estimation of Translation Quality Tags>

The translation quality tag estimation part 130 can estimate translation quality tags using a tagging technique that is the same or substantially the same as in named entity recognition that uses a pre-trained multilingual model (reference document [3]). That is, the sequence "[CLS] source sentence [SEP] machine-translated sentence [SEP]" is input to a pre-trained multilingual model, and, in the output layer added to the pre-trained multilingual model, the probability of each word being OK or BAD is predicted. For each word, the output layer determines that the word is OK if the probability exceeds a predetermined threshold, and determines that the word is BAD if the probability falls below the threshold. FIG. 10 shows that the translation quality tag in the machine-translated sentence corresponding to each word of the source sentence is output.

(On Training of Translation Quality Tags)

When the translation quality tag training part 110 trains the estimation quality tag model, the same or substantially the same process as that described above is basically used. However, the input in this case is training data for translation quality tags, and the parameters are adjusted such that the error between the output and the correct answer is minimized.

This will be explained in more detail below.

Let the source sentence be $S=[s_1, s_2, \ldots, s_i, \ldots, s_m]$, and its machine-translated sentence be $T=[t_1, t_2, \ldots, t_j, \ldots, t_n]$. The probability of each word being labeled with the "OK" or "BAD" tag is calculated in the output layer as follows. During the estimation, the output layer determines that a word is "OK" if the probability exceeds a predetermined threshold, and "BAD" if the probability falls below the threshold.

[Mathematical formula 2]

$$p_{s_i} = \text{sigmoid}\left(w_{src}^T h_i + b_{src}\right)$$

$$p_{t_j} = \text{sigmoid}\left(w_{mt}^T g_j + b_{mt}\right)$$

where $h_i$ and $g_j$ are outputs of the pre-trained multilingual model for words in the source sentence and words in the machine-translated sentence.

In this way, translation quality tags need not be determined based simply on binary classification; instead, outputs of a pre-trained multilingual model for words in the source sentence and words in the machine-translated sentence may be used, and different standards for determining translation quality tags may be used between the source sentence and the machine-translated sentence. To be more specific, for example, [Mathematical Formula 2] may be used such that different thresholds for determining whether translation quality tags are "OK" or "BAD" may be used between the source sentence and the machine-translated sentence.

The estimation quality tag model is pre-trained to minimize the average of the following binary entropy loss with respect to all words:

[Mathematical formula 3]

$$\mathcal{L}_{s_i} = y_{s_i}\log(p_{s_i}) + (1 - y_{s_i})\log(1 - p_{s_i})$$

$$\mathcal{L}_{t_j} = y_{t_j}\log(p_{t_j}) + (1 - y_{t_j})\log(1 - p_{t_j})$$

-continued $$\mathcal{L} = \frac{1}{m+n}\left(\sum_{i=1}^{m}\mathcal{L}_{s_i} + \sum_{j=1}^{n}\mathcal{L}_{t_j}\right)$$

(Example Hardware Structure)

The above-described edit tag estimation system, learning apparatus 100, and estimation apparatus 200 can all be implemented, for example, by running a program on a computer. This computer may be a physical computer or a virtual machine on a cloud. The edit tag estimation system, the learning apparatus 100, and the estimation apparatus 200 will be hereinafter collectively referred to as "apparatuses."

That is, the apparatuses can be implemented by running a program that corresponds to the processes that the respective apparatuses perform using hardware resources such as a CPU and a memory built in the computer. The program can be recorded in a computer-readable recording medium (such as a portable memory) and thus saved there or distributed. The program can also be provided via a network such as the Internet or e-mail.

Figure 11:
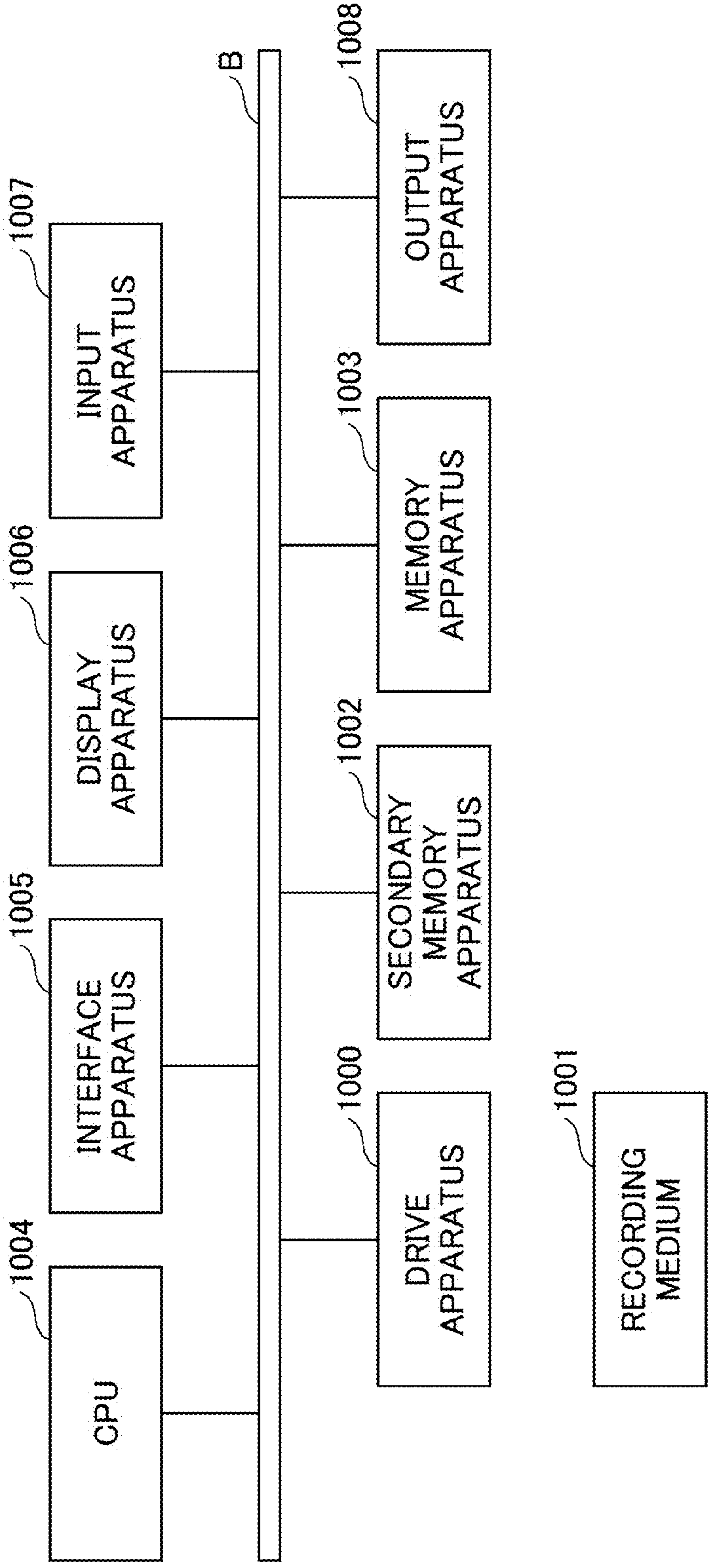
FIG. 11 is a diagram showing an example hardware structure with multiple apparatuses.

FIG. 11 is a diagram showing an example hardware structure of a computer. The computer in FIG. 11 includes a drive apparatus 1000, a secondary memory apparatus 1002, a memory apparatus 1003, a CPU 1004, an interface apparatus 1005, a display apparatus 1006, an input apparatus 1007, an output apparatus 1008, and so forth, all of which are interconnected by a bus BS.

The program for implementing processes on the computer is provided by a recording medium 1001 such as a CD-ROM or a memory card. The recording medium 1001 storing the program is set in the drive apparatus 1000, and the program is installed from the recording medium 1001 into the secondary memory apparatus 1002 through the drive apparatus 1000. However, the program does not necessarily have to be installed from the recording medium 1001, and may be down-loaded from another computer via a network. The secondary memory apparatus 1002 stores installed programs, as well as necessary files, data, and the like.

When an instruction to start a program is received as an input, the memory apparatus 1003 reads the program from the secondary memory apparatus 1002 and stores it. The CPU 1004 implements the functions of the apparatuses related to the program stored in the memory apparatus 1003. The interface apparatus 1005 is used as an interface for connecting with a network or the like. The display apparatus 1006 displays a GUI (Graphical User Interface) or the like according to the program. The input apparatus 1007 may be a keyboard, a mouse, buttons, a touch panel, or the like, and used to input various operational instructions. The output apparatus 1008 outputs the calculation results.

Advantages of Embodiment

An evaluation experiment was conducted using the technique according to the present embodiment, and the details will be explained below.

<Data Used in Evaluation Experiment>

In order to verify the effectiveness of the technique according to the present embodiment, the following experiment was conducted using data obtained from a word-level quality estimation protocol presented at the international conference WMT-2020 [15]. This data consisted of translations from English to German ("En-De") and translations from English to Chinese ("En-Zh").

For each language pair (En-De or En-Zh), training data, development data, and test data were prepared, consisting of 7,000 sentences, 1,000 sentences, and 1,000 sentences, respectively. A source sentence, a machine-translated sentence, and a post-edited sentence were used as one piece of "data." Each word in the source sentence, each word in the machine-translated sentence, and each gap in the machine-translated sentence were labeled with a translation quality tag.

In addition, as for the word alignment data, results of automatic word alignment using FastAlign were used. To evaluate the extended word alignment, development data of 200 sentences in English and German and 200 sentences in English and Chinese was manually labeled with correct answers of extended word alignment. To assess the effectiveness of supervised extended word alignment, the remaining 800 sentences of the development data in English and German were also manually labeled with correct answers of extended word alignment.

As for the pre-trained multilingual model, multilingual BERT (mBERT) and XLM-R were used.

<Accuracy of Extended Word Alignment>

FIG. 12 shows the accuracy of extended word alignment with respect to the 200 sentences of development data. The accuracy of word alignment is evaluated based on "precision" (P), "recall" (R), and "F1," which is the harmonic mean of the first two.

The baseline is the accuracy of word alignment determined by FastAlign, a word alignment tool designed based on a statistical translation model. The accuracy of the word alignment tool AWESoME, which uses a pre-trained multilingual model, was significantly higher than that of FastAlign.

The accuracy of mBERT shown in FIG. 12 was obtained when the extended word alignment model of the present embodiment was pre-trained using AWESoME's word alignment as training data (pseudo reference data) for extended word alignment. The accuracy of ft-mBERT (fine-tuned mBERT) was demonstrated when the extended word alignment model of the present embodiment was pre-trained using manually-created 800 sentences of reference data.

Training the extended word alignment model of the present embodiment using pseudo reference data that was created using AWESoME yielded higher accuracy than when AWESoME was used directly. If manually-created reference data is available, using it for fine-tuning will yield even higher accuracy.

<Accuracy of Labeling of Translation Quality Tags>

FIG. 13 shows the accuracy of labeling of translation quality tags ("OK" and "BAD"). The accuracy of labeling of translation quality tags is evaluated using MCC (Matthews Correlation Coefficient), which is the official rating scale for word-level quality estimation in WMT-2020.

Shown in FIG. 13, OpenKiwi is a system specified as the baseline for word-level quality estimation in WMT-2020. The accuracies of mBERT and XLM-R were demonstrated when the estimation quality tag model of the present embodiment was pre-trained into pre-trained multilingual models by using mBERT and XLM-R, respectively.

As shown in FIG. 13, the labeling of translation quality tags according to the present embodiment is more accurate than that of OpenKiwi. There is no clear trend as to which one of mBERT and XLM provides a better pre-trained multilingual model, because their performance might vary depending on the source sentence, the machine-translated sentence, and the language pair.

<Accuracy of Labeling of Edit Tags>

FIG. 14 shows the accuracy of labeling of edit tags in English-German translation. FIG. 15 shows the accuracy of labeling of edit tags in English-Chinese translation. The labeling of edit tags was evaluated based on F1 of all words' tags. In FIG. 14 and FIG. 15, the values of F1 of the tags "OK," "INS," "DEL," and "REP" are shown in parentheses. The accuracy of labeling of edit tags was evaluated per combination of the method of determining extended word alignment and the method of determining translation quality tags.

Compared to the baseline combination of FastAlign and OpenKiwi, the combination of extended word alignment and labeling of translation quality tags according to the present embodiment demonstrated significantly higher accuracy. There is no clear trend as to which one of mBERT and XLM-R provides a better pre-trained multilingual model. When manually-created reference data for extended word alignment is available, determining extended word alignment by using manually-created reference data rather than pseudo reference data resulted in higher accuracy of labeling of edit tags.

Summary of Embodiment

The technique in the present embodiment not only labels each word in the source sentence in the original language and the machine-translated sentence in the target language with a quality tag of machine translation, as in existing word-level translation quality estimation, but also determines extended word alignment between a source sentence and its machine-translated sentence. This allows the post-editor to present quality tags that sub-divide the edit operations he/she should perform, such as "INS," "DEL," and "REP."

Also, the technique of the present embodiment is expected to reduce the psychological burden on the post-editor by presenting extended word alignment and translation quality tags, or extended word alignment and edit tags, to the post-editor.

Also, the technique according to the present embodiment can be applied to any language pair included in the pre-trained multilingual model.

Also, the extended word alignment model and estimation quality tag model in the present embodiment are based on supervised learning, but can be pre-trained using automatically-prepared pseudo reference data. Training using manually-created reference data can achieve still higher accuracy.

(Notes)

The following notes provide further disclosures of the above-described embodiment.

(Note 1)

An estimation apparatus including:

- an input part configured to receive, as inputs, an extended word alignment between a source sentence and a translated sentence, and translation quality tags between the source sentence and the translated sentence; and
- an edit tag estimation part configured to estimate an edit tag based on the extended word alignment and the translation quality tags.

(Note 2)

The estimation apparatus according to note 1, further including an extended word alignment estimation part configured to estimate the extended word alignment between the source sentence and the translated sentence based on a pre-trained extended word alignment model.

(Note 3)

The estimation apparatus according to note 1 or note 2, in which the edit tag estimation part is further configured to estimate at least one of the following tags as the edit tag based on the extended word alignment and the translation quality tags:

a replace tag that indicates that a word in the translated sentence needs to be replaced with a correct translation of a word in the source sentence;

an insert tag that indicates that a translation of a word in the source sentence needs to be inserted in the translated sentence; or a delete tag that indicates that a word needs to be deleted from the translated sentence.

(Note 4)

A learning apparatus including:

an input part configured to receive, as inputs, pseudo reference data and reference data, the pseudo reference data being created automatically by software for extended word alignment between a source sentence and a machine-translated sentence, and the reference data being created manually for the extended word alignment between the source sentence and the machine-translated sentence; and an extended word alignment training part configured to create a language model by fine-tuning a pre-trained multilingual model using the pseudo reference data, and create an extended word alignment model by fine-tuning the language model using the reference data.

Note that, referring to the above additional notes, in the phrase "pseudo reference data and reference data, the pseudo reference data being created automatically by software for extended word alignment between a source sentence and a machine-translated sentence, and the reference data being created manually for the extended word alignment between the source sentence and the machine-translated sentence," the part "created automatically by software" modifies the "pseudo reference data," the part "between a source sentence and a machine-translated sentence" modifies the "extended word alignment," and the part "created manually" modifies the "reference data."

(Note 5)

A computer-implemented estimation method including:

receiving, as inputs, an extended word alignment between a source sentence and a translated sentence, and translation quality tags between the source sentence and the translated sentence; and estimating an edit tag based on the extended word alignment and the translation quality tags.

(Note 6)

A computer-implemented learning method including:

creating a language model by fine-tuning a pre-trained multilingual model using pseudo reference data for an extended word alignment between a source sentence and a machine-translated sentence, the pseudo data being created automatically by software; and creating an extended word alignment model by fine-tuning the language model using reference data for the extended word alignment between the source sentence and the machine-translated sentence, the reference data being created manually.

(Note 7)

A program that causes a computer to function as each part of the estimation apparatus of one of note 1 to note 3.

(Note 8)

A program that causes a computer to function as each part of the learning apparatus of note 4.

LIST OF REFERENCE DOCUMENTS

[1] Alexis Conneau, Kartikay Khandelwal, Naman Goyal, Vishrav Chaudhary, Guillaume Wenzek, Francisco Guzm'an, Edouard Grave, Myle Ott, Luke Zettlemoyer, and Veselin Stoyanov. Unsupervised cross-lingual representation learning at scale. In Proceedings of ACL-2020, pp. 8440-8451, 2020.

[2] Alexis Conneau and Guillaume Lample. Cross-lingual Language Model Pretraining. In Proceedings of NeurIPS-2019, pp. 7059-7069, 2019.

[3] Jacob Devlin, Ming-Wei Chang, Kenton Lee, and Kristina Toutanova. Bert: Pre-training of deep bidirectional transformers for language understanding. In Proceedings of the NAACL-2019, pp. 4171-4186, 2019.

[4] Zi-Yi Dou and Graham Neubig. Word alignment by fine-tuning embeddings on parallel corpora. In Proceedings of EACL-2021, pp. 2112-2128, 2021.

[5] Chris Dyer, Victor Chahuneau, and Noah A. Smith. A simple, fast, and effective reparameterization of ibm model 2. In Proceedings of the NAACL-HLT-2013, pp. 644-648, 2013.

[6] Erick Fonseca, Lisa Yankovskaya, Andr'e F. T. Martins, Mark Fishel, and Christian Federmann. Findings of the WMT 2019 shared tasks on quality estimation. In Proceedings of the WMT-2019, pp. 1-10, 2019.

[7] Sarthak Garg, Stephan Peitz, Udhyakumar Nallasamy, and Matthias Paulik. Jointly learning to align and translate with transformer models. In Proceedings of the EMNLP-IJCNLP-2019, pp. 4452-4461, 2019.

[8] Fabio Kepler, Jonay Tr'enous, Marcos Treviso, Miguel Vera, Ant'onio G'ois, M. Amin Farajian, Ant'onio V. Lopes, and Andr'e F. T. Martins. Unbabel's participation in the WMT19 translation quality estimation shared task. In Proceedings of the WMT-2019, pp. 78-84, 1999.

[9] Hyun Kim, Joon-Ho Lim, Hyun-Ki Kim, and Seung-Hoon Na. QE BERT: Bilingual BERT using multi-task learning for neural quality estimation. In Proceedings of the WMT-2019, pp. 85-89, 1999.

[10] Philipp Koehn, Hieu Hoang, Alexandra Birch, Chris Callison-Burch, Marcello Federico, Nicola Bertoldi, Brooke Cowan, Wade Shen, Christine Moran, Richard Zens, Chris Dyer, Ondrej Bojar, Alexandra Constantin, and Evan Herbst. Moses: Open Source Toolkit for Statistical Machine Translation. In Proceedings of the ACL-2007, pp. 177-180, 2007.

[11] Masaaki Nagata, Katsuki Chousa, and Masaaki Nishino. A supervised word alignment method based on cross-language span prediction using multilingual BERT. In Proceedings of EMNLP-2020, pp. 555-565, 2020.

[12] Franz Josef Och and Hermann Ney. A systematic comparison of various statistical alignment models. Computational Linguistics, Vol. 29, No. 1, pp. 19-51, 2003. 11

[13] Lane Schwartz, Isabel Lacruz, and Tatyana Bystrova. Effects of word alignment visualization on post-editing quality & speed. In Proceedings of Machine Translation Summit XV, pp. 186-199, 2015.

[14] Ashish Vaswani, Noam Shazeer, Niki Parmar, Jakob Uszkoreit, Llion Jones, Aidan N. Gomez, Lukasz Kaiser, and Illia Polosukhin. Attention is all you need. In Proceedings of the NIPS 2017, pp. 5998-6008, 2017.

[15] Findings of the WMT 2020 Shared Task on Quality Estimation Lucia Specia, Fr'ed'eric Blain, Marina Fomicheva, Erick Fonseca, Vishrav Chaudhary, Francisco Guzm'an, Andr'e F. T. Martins (https://aclanthology.org/2020.wmt-1.79/)

Although the present embodiment has been described above, the present disclosure is not limited to such a specific embodiment, and various modifications and changes are possible within the scope of the gist of the present disclosure as defined in the accompanying claims.

EXPLANATION OF SYMBOLS

100 Learning apparatus
120 Extended word alignment training part
122 Pre-trained multilingual model DB
111 Translation quality tag training data DB
121 Extended word alignment training data DB
140 Extended word alignment estimation part
141 Extended word alignment model DB
110 Estimation quality tag model training part
112 Pre-trained multilingual model DB
130 Estimation quality tag model estimation part
131 Estimation quality tag model DB
150 Edit tag estimation part
108, 118, 128, 138, 148 Input part
109, 119, 129, 139, 149 Output part
200 Estimation apparatus
1000 Drive apparatus
1001 Recording medium
1002 Secondary memory apparatus
1003 Memory apparatus
1004 CPU
1005 Interface apparatus
1006 Display apparatus
1007 Input apparatus
1008 Output apparatus

The invention claimed is:

1. An estimation system comprising:

a processor; and a memory storing therein a set of instructions which, when executed by the processor, cause the estimation system to:

create an extended word alignment model by training a multilingual model;

store the extended word alignment model in a model database;

receive a source sentence and a machine-translated sentence of the source sentence;

estimate an extended word alignment between the source sentence and the machine-translated sentence of the source sentence using the extended word alignment model, the extended word alignment referring to a function to show, per word, whether or not the machine-translated sentence of the source sentence is a correct translation of the source sentence, and also referring to a correctly or incorrectly machine-translated or aligned word pair;

estimate translation quality tags, with which the source sentence and the machine-translated sentence of the source sentence are labeled per word using a translation quality tag model;

estimate edit tags based on the extended word alignment and the translation quality tags;

divide the edit tags into a replace tag indicating that a first word in the machine-translated sentence of the source sentence is replaced with a correct translation of the first word in the source sentence, an insert tag indicating that a translation of a second word is inserted into the machine-translated sentence of the source sentence and a delete tag indicating that a translation of a third word is deleted from the machine-translated sentence of the source sentence;

label the source sentence with one of the replace tag or the insert tag, label the machine-translated sentence of the source sentence with the delete tag; and output the labeled source sentence and the labeled machine-translated sentence of the source sentence to a display;

wherein the second word is included in the source sentence, the second word is not included the machine-translated sentence of the source sentence, and wherein the third word is not included the source sentence, the third word is included the machine-translated sentence of the source sentence.

2. A computer-implemented estimation method comprising:

creating an extended word alignment model by training a multilingual model;

storing the extended word alignment model in a model database;

receiving a source sentence and a machine-translated sentence of the source sentence;

estimating an extended word alignment between the source sentence and the machine-translated sentence of the source sentence using the extended word alignment model, the extended word alignment referring to a function to show, per word, whether or not the machine-translated sentence of the source sentence is a correct translation of the source sentence, and also referring to a correctly or incorrectly machine-translated or aligned word pair;

estimating translation quality tags, with which the source sentence and the machine-translated sentence of the source sentence are labeled per word using a translation quality tag model;

estimating edit tags based on the extended word alignment and the translation quality tags;

dividing the edit tags into a replace tag indicating that a first word in the machine-translated sentence of the source sentence is replaced with a correct translation of the first word in the source sentence, an insert tag indicating that a translation of a second word is inserted into the machine-translated sentence of the source sentence and a delete tag indicating that a translation of a third word is deleted from the machine-translated sentence of the source sentence;

labeling the source sentence with one of the replace tag or the insert tag, label the machine-translated sentence of the source sentence with the delete tag; and outputting the labeled source sentence and the labeled machine-translated sentence of the source sentence to a display;

wherein the second word is included in the source sentence, the second word is not included the machine-translated sentence of the source sentence, and wherein the third word is not included the source sentence, the third word is included the machine-translated sentence of the source sentence.

3. A computer-readable non-transitory recording medium storing therein a program that, when executed by a computer, causes the computer to perform an estimation method comprising:

creating an extended word alignment model by training a multilingual model;

storing the extended word alignment model in a model database;

receiving a source sentence and a machine-translated sentence of the source sentence;

estimating an extended word alignment between the source sentence and the machine-translated sentence of the source sentence using the extended word alignment model, the extended word alignment referring to a function to show, per word, whether or not the machine-translated sentence of the source sentence is a correct translation of the source sentence, and also referring to a correctly or incorrectly machine-translated or aligned word pair;

estimating translation quality tags, with which the source sentence and the machine-translated sentence of the source sentence are labeled per word using a translation quality tag model;

estimating edit tags based on the extended word alignment and the translation quality tags;

dividing the edit tags into a replace tag indicating that a first word in the machine-translated sentence of the source sentence is replaced with a correct translation of the first word in the source sentence, an insert tag indicating that a translation of a second word is inserted into the machine-translated sentence of the source sentence and a delete tag indicating that a translation of a third word is deleted from the machine-translated sentence of the source sentence;

labeling the source sentence with one of the replace tag or the insert tag, label the machine-translated sentence of the source sentence with the delete tag; and outputting the labeled source sentence and the labeled machine-translated sentence of the source sentence to a display;

wherein the second word is included in the source sentence, the second word is not included the machine-translated sentence of the source sentence, and wherein the third word is not included the source sentence, the third word is included the machine-translated sentence of the source sentence.

4. The estimation system according to claim 1, wherein the instructions, when executed by the processor, cause the estimation system to:

label a fourth word of the source sentence with one of the replace tag or the insert tag, label a fifth word of the machine-translated sentence of the source sentence with the delete tag; and wherein the fourth word is labeled with a bad tag of the quality tags using the translation quality tag model, wherein the fifth word is labeled with the bad tag of the quality tags using the translation quality tag model, and wherein the bad tag indicates that a word of the source sentence is not translated in the machine-translated sentence of the source sentence, or that a word of the machine-translated sentence of the source sentence is mistranslated.

* * * * *